United States Patent
Xiong et al.

(10) Patent No.: US 7,705,932 B2
(45) Date of Patent: Apr. 27, 2010

(54) DOUBLE-SIDED LIQUID CRYSTAL DISPLAY HAVING DIFFERENTLY SIZED OPTICAL FILM ASSEMBLIES

(75) Inventors: Gui-Zhen Xiong, Shenzhen (CN); Wen-Bin Lin, Shenzhen (CN); Ching-Huang Lin, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 622 days.

(21) Appl. No.: 11/641,921

(22) Filed: Dec. 18, 2006

(65) Prior Publication Data
US 2007/0139585 A1 Jun. 21, 2007

(30) Foreign Application Priority Data
Dec. 16, 2005 (TW) ............................... 94144811 A

(51) Int. Cl.
*G02F 1/1347* (2006.01)
(52) U.S. Cl. .............................. 349/74; 349/56; 349/77; 349/83
(58) Field of Classification Search .................... 349/56, 349/74, 77, 83
See application file for complete search history.

(56) References Cited

U.S. PATENT DOCUMENTS

| 7,186,014 B2 | 3/2007 | Shimura |
| 2004/0032388 A1 | 2/2004 | Tsai et al. |
| 2005/0068486 A1 | 3/2005 | Ono |
| 2005/0195344 A1 | 9/2005 | Chang et al. |

FOREIGN PATENT DOCUMENTS

| CN | 1580906 A | 2/2005 |
| TW | 200530695 A | 9/2005 |
| TW | 200538821 A | 12/2005 |

*Primary Examiner*—Jennifer Doan
(74) *Attorney, Agent, or Firm*—Wei Te Chung

(57) ABSTRACT

An exemplary double-sided liquid crystal display (LCD) (200) includes a first liquid crystal panel (212), a first optical film assembly (211), a light guide plate (230), a second optical film assembly (211), and a second liquid crystal panel (222) arranged in that order from bottom to top. An area of the second liquid crystal panel is less than an area of the first liquid crystal panel, and an area of the second optical film assembly is less than an area of the first optical film assembly. The second optical film assembly of the double-sided LCD has a size no larger than that needed to perform its function in respect of light beams propagating therethrough from the light guide plate to the second liquid crystal panel. Therefore, the double-sided LCD is cost-efficient.

13 Claims, 2 Drawing Sheets

DOUBLE-SIDED LIQUID CRYSTAL DISPLAY
HAVING DIFFERENTLY SIZED OPTICAL
FILM ASSEMBLIES

FIELD OF THE INVENTION

The present invention relates to liquid crystal displays (LCDs), and particularly to a double-sided liquid crystal display that includes two differently sized optical film assemblies.

GENERAL BACKGROUND

Different kinds of LCDs have been used in a variety of applications. A double-sided LCD includes front and rear LCD panels, which are coupled together back-to-back. The LCD panels used in the double-sided LCD may have the same size or different sizes. In a typical mobile phone, the LCD panels have different sizes. The double-sided LCD further includes a double-sided backlight module disposed between the front and rear LCD panels.

Referring to FIG. 4, a typical double-sided LCD used in a mobile phone is shown. The double-sided LCD 100 includes a light guide plate 130, a light source 140, a first optical film assembly 111, a second optical film assembly 121, a first liquid crystal panel 112, a second liquid crystal panel 122, and a frame 150 for fixing the above components. The light guide plate 130 includes a light incident surface 133, a first light emitting surface 131 perpendicularly connected with the light incident surface 133, and a second light emitting surface 132 opposite to the first light emitting surface 131. The first optical film assembly 111 and the first liquid crystal panel 112 are disposed adjacent to the first light emitting surface 131 of the light guide plate 130, in that order from top to bottom. The second optical film assembly 121 and the second liquid crystal panel 122 are disposed adjacent to the second light emitting surface 132 of the light guide plate 130, in that order from bottom to top. The light guide plate 130, the first optical film assembly 111, the second optical film assembly 121, and the first liquid crystal panel 112 have substantially equivalent areas. An area of the second liquid crystal panel 122 is much less than that of the first liquid crystal panel 112. Generally, the first liquid crystal panel 112 is used as a main display, and the second liquid crystal panel 122 is used as a secondary display.

Light beams emitted from the light source 140 enter the light guide plates 130 through the light incident surface 133. Some of the light beams are then emitted directly from the first and second light emitting surfaces 131, 132. Other of the light beams are emitted from the first and second light emitting surfaces 131, 132 after being reflected one or more times in the light guide plate 130. All light beams emitted from the first and second light emitting surfaces 131, 132 respectively transmit through the first and second optical film assemblies 111, 121 and through the first and second liquid crystal panels 112, 122. Thereby, a double-sided display is achieved.

The first and second optical film assemblies 111, 121 have equivalent areas, yet the second liquid crystal panel 122 has an area much smaller than that of the first liquid crystal panel 112. Thus part of the second optical film assembly 121 is essentially not utilized, while the cost of the double-sided LCD 100 includes the full cost of the second optical film assembly 121.

Therefore, a new double-sided LCD that can overcome the above-described problems is desired.

SUMMARY

In one preferred embodiment, a double-sided liquid crystal display (LCD) includes a first liquid crystal panel, a first optical film assembly, a light guide plate, a second optical film assembly, and a second liquid crystal panel arranged in that order from one side of the double-sided LCD to an opposite side of the double-sided LCD. An area of the second liquid crystal panel is less than an area of the first liquid crystal panel, and an area of the second optical film assembly is less than an area of the first optical film assembly.

Other advantages and novel features will become more apparent from the following detailed description when taken in conjunction with the accompanying drawings. In the drawings, all the views are schematic.

DETAILED DESCRIPTION OF PREFERRED
EMBODIMENTS

Figure 1:
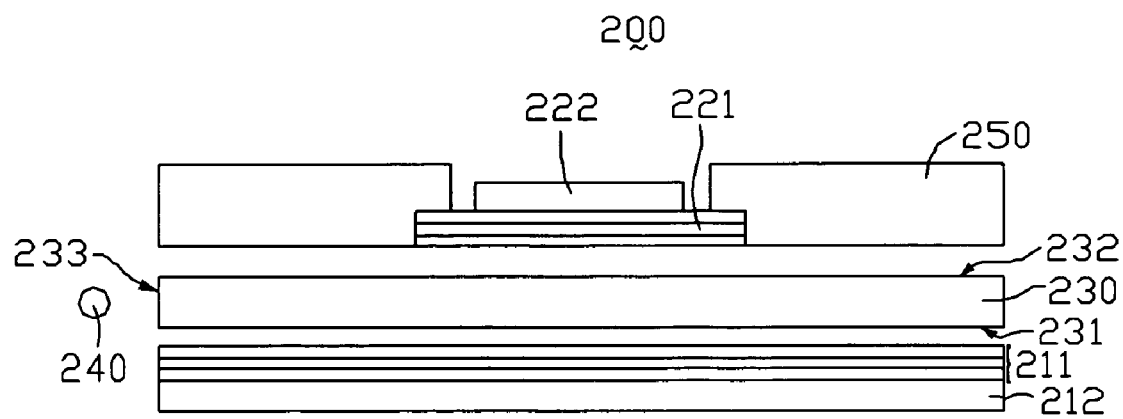
FIG. 1 is an exploded, side view of a double-sided liquid crystal display according to a first embodiment of the present invention.

Referring to FIG. 1, a double-sided liquid crystal display (LCD) 200 according to a first embodiment of the present invention is shown. The double-sided LCD 200 includes a light guide plate 230, a light source 240, a first optical film assembly 211, a second optical film assembly 221, a first liquid crystal panel 212, a second liquid crystal panel 222, and a frame 250 for fixing the above components. The light guide plate 230 includes a light incident surface 233, a first light emitting surface 231 perpendicularly connected with the light incident surface 233, and a second light emitting surface 232 opposite to the first light emitting surface 231. The light source 240 is located adjacent to the light incident surface 233 of the light guide plate 230. The first optical film assembly 211 and the first liquid crystal panel 212 are disposed adjacent to the first light emitting surface 231 of the light guide plate 230, in that order from top to bottom. The second optical film assembly 221 and the second liquid crystal panel 222 are disposed adjacent to a middle of the second light emitting surface 232 of the light guide plate 230, in that order from bottom to top.

The light guide plate 230, the first optical film assembly 211, and the first liquid crystal panel 212 have substantially equivalent areas. An area of the second optical film assembly 221 is much less than the area of the first optical film assembly 211. An area of the second liquid crystal panel 222 is much less than the area of the first liquid crystal panel 212, and is a little less than the area of the second optical film assembly 221. Generally, the first liquid crystal panel 212 is used as a main display, and the second liquid crystal panel 222 is used as a secondary display. The first and second optical film assemblies 211, 221 may each include a plurality of diffusing films and/or light enhancement films.

Light beams emitted from the light source 240 enter the light guide plates 230 through the light incident surface 233. Some of the light beams are then emitted directly from the first and second light emitting surfaces 231, 232. Other of the light beams are emitted from the first and second light emitting surfaces 231, 232 after being reflected one or more times in the light guide plate 230. All light beams emitted from the first and second light emitting surfaces 231, 232 respectively transmit through the first and second optical film assemblies 211, 221, and through the first and second liquid crystal panels 212, 222. Thereby, a double-sided display is achieved.

In summary, the second optical film assembly 221 of the double-sided LCD 200 has a size no larger than that needed to perform its function in respect of light beams propagating therethrough from the second light emitting surface 232 to the second liquid crystal panel 222. Therefore, the double-sided LCD 200 is cost-efficient.

Figure 2:
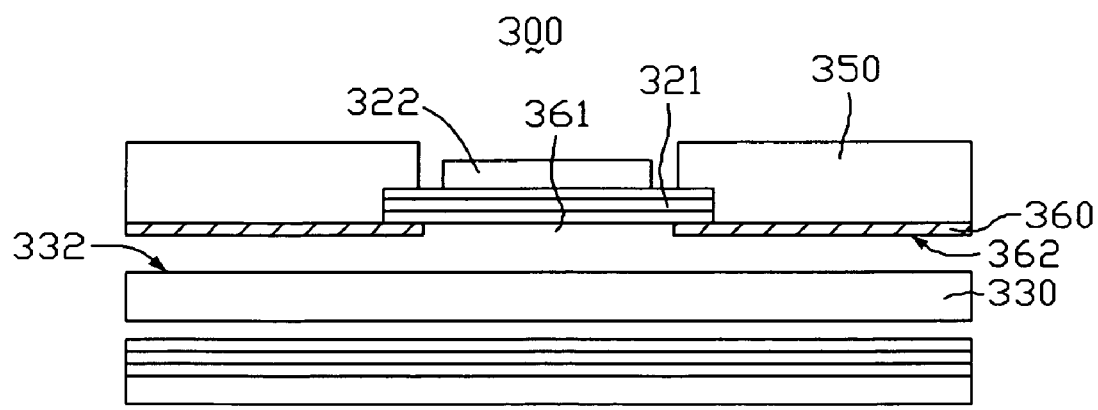
FIG. 2 is an exploded, side cross-sectional view of a double-sided liquid crystal display according to a second embodiment of the present invention.

Referring to FIG. 2, a double-sided LCD 300 according to a second embodiment of the present invention is shown. The double-sided LCD 300 is similar to the double-sided LCD 200 of the first embodiment. However, the double-sided LCD 300 further includes a reflective plate 360 disposed at an inside of a frame 350. The reflective plate 360 defines a central opening 361, corresponding to a second optical film assembly 321 and a second liquid crystal panel 322. An area of the opening 361 is slightly or even substantially less than that of the second optical film assembly 321, and is greater than that of the second liquid crystal panel 322. The reflective plate 360 includes a reflective surface 362 opposite to a second light emitting surface 332 of a light guide plate 330. The reflective plate 360 can avoid bright lines being displayed on a first liquid crystal panel (not labeled), which bright lines might otherwise be caused by bright light of peripheral edges of the second optical film assembly 321. Thus a uniformity of display of the first liquid crystal panel can be enhanced.

Figure 3:
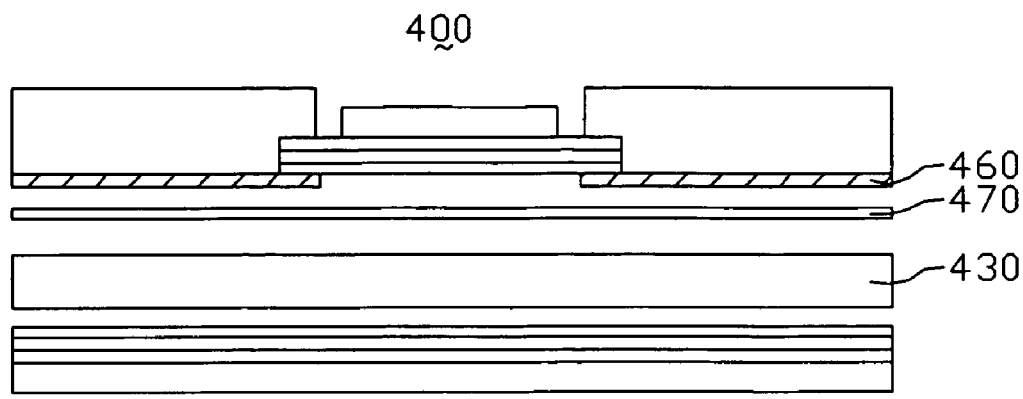
FIG. 3 is an exploded, side cross-sectional view of a double-sided liquid crystal display according to a third embodiment of the present invention.
Figure 4:
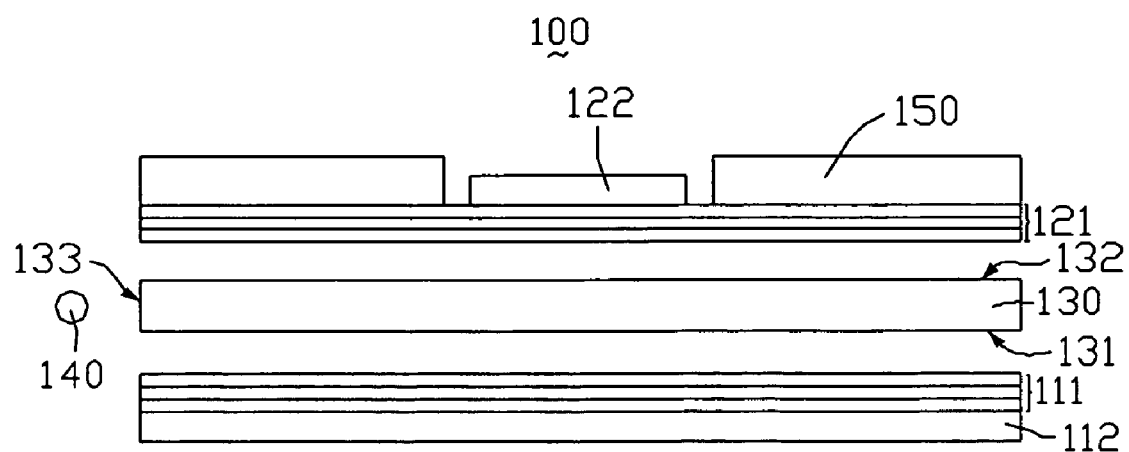
FIG. 4 is an exploded, side view of a conventional double-sided liquid crystal display.

Referring to FIG. 3, a double-sided LCD 400 according to a third embodiment of the present invention is shown. The double-sided LCD 400 is similar to the double-sided LCD 300 of the second embodiment. However, the double-sided LCD 400 further includes a diffusing film 470 disposed between a reflective plate 460 and a light guide plate 430. The diffusing film 470 can prevent a border of the reflective plate 460 from impairing a display quality of a first liquid crystal panel (not labeled) of the double-sided LCD 400.

Further or alternative embodiments may include the following. In one example, the reflective plate 360 of the second embodiment can be replaced by a transflective film. In another example, the reflective plate 360 can be replaced by a white and black film. A white surface of the white and black film faces the second light emitting surface 332 of the light guide plate 330. In a further example, the diffusing film 470 of the third embodiment can be replaced by a transflective film.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A double-sided liquid crystal display (LCD) comprising:
a first liquid crystal panel;
a first optical film assembly;
a light guide plate;
a second optical film assembly;
a second liquid crystal panel;
wherein the first liquid crystal panel, the first optical film assembly, the light guide plate, the second optical film assembly and the second liquid crystal panel are arranged in that order from one side of the double-sided LCD to an opposite side of the double-sided LCD;
wherein an area of the second liquid crystal panel is less than an area of the first liquid crystal panel, and an area of the second optical film assembly is less than an area of the first optical film assembly, and wherein a frame fixes the first liquid crystal panel, the first optical film assembly, the light guide plate, the second optical film assembly, and the second liquid crystal panel, where a reflective plate is located at an inside of the frame and a diffusing film is located between the light guide plate and the reflective plate.

2. The double-sided LCD as claimed in claim 1, wherein the light guide plate includes a light incident surface at a first side thereon a first light emitting surface at a second side thereof adjacent to the first side, and a second light emitting surface at a third side thereof opposite to the second side.

3. The double-sided LCD as claimed in claim 2, further comprising a light source located adjacent to the light incident surface of the light guide plate.

4. The double-sided LCD as claimed in claim 2, wherein the first optical film assembly and the first liquid crystal panel are located adjacent to the first light emitting surface of the light guide plate, and the second optical film assembly and the second liquid crystal panel are located adjacent to the middle of the second light emitting surface of the light guide plate.

5. The double-sided LCD as claimed in claim 1, wherein the reflective plate has an opening defined therein, the opening corresponds to the second liquid crystal panel, and an area of the opening corresponds to the area of the second liquid crystal panel.

6. The double-sided LCD as claimed in claim 5, wherein the area of the opening is less than the area of the second optical film assembly.

7. The double-sided LCD as claimed in claim 5, wherein area of the opening is greater than the area of the second liquid crystal panel.

8. The double-sided LCD as claimed in claim 5, further comprising a transflective film located between the light guide plate and the reflective plate.

9. The double-sided LCD as claimed in claim 1, further comprising a transflective film located at an inside of the frame.

10. The double-sided LCD as claimed in claim 1, further comprising a white and black film located at an inside of the frame, a white surface of the white and black film facing the light guide plate.

11. The double-sided LCD as claimed in claim 1, wherein each of the first and second optical film assemblies comprises at least one item selected from the group consisting of a diffusing film and a light enhancement film.

12. A double-sided liquid crystal display (LCD) comprising:
a first liquid crystal panel;
a first optical film assembly;
a light guide plate;
a second optical film assembly; and
a second liquid crystal panel;
wherein the first liquid crystal panel, the first optical film assembly, the light guide plate, the second optical film assembly and the second liquid crystal panel are arranged in that order from one side of the double-sided LCD to an opposite side of the double-sided LCD;

wherein an area of the first liquid crystal panel is essentially the same as that of the first optical film assembly while an area of the second liquid crystal panel is essentially less than that of the second optical film assembly, and wherein a frame fixes the first liquid crystal panel, the first optical film assembly, the light guide plate, the second optical film assembly, and the second liquid crystal panel, where a reflective plate is located at an inside of the frame and a diffusing film is located between the light guide plate and the reflective plate.

13. A double-sided liquid crystal display (LCD) comprising:
   a first liquid crystal panel;
   a first optical film assembly;
   a light guide plate;
   a second optical film assembly; and
   a second liquid crystal panel;
wherein the first liquid crystal panel, the first optical film assembly, the light guide plate, the second optical film assembly and the second liquid crystal panel are arranged in that order from one side of the double-sided LCD to an opposite side of the double-sided LCD; and
wherein an area of the second liquid crystal panel is less than an area of the first liquid crystal panels and the second liquid crystal panel is surrounded by a frame structure which also circumferentially holds the second optical film assembly, and wherein a frame fixes the first liquid crystal panel, the first optical film assembly, the light guide plate, the second optical film assembly, and the second liquid crystal panel, where a reflective plate is located at an inside of the frame and a diffusing film is located between the light guide plate and the reflective plate.

* * * * *